July 23, 1929.   R. O. BOYKIN   1,721,686
METHOD OF EXTRACTING OILS FROM OLEAGINOUS MATERIALS
Filed Nov. 22, 1926   2 Sheets-Sheet 1

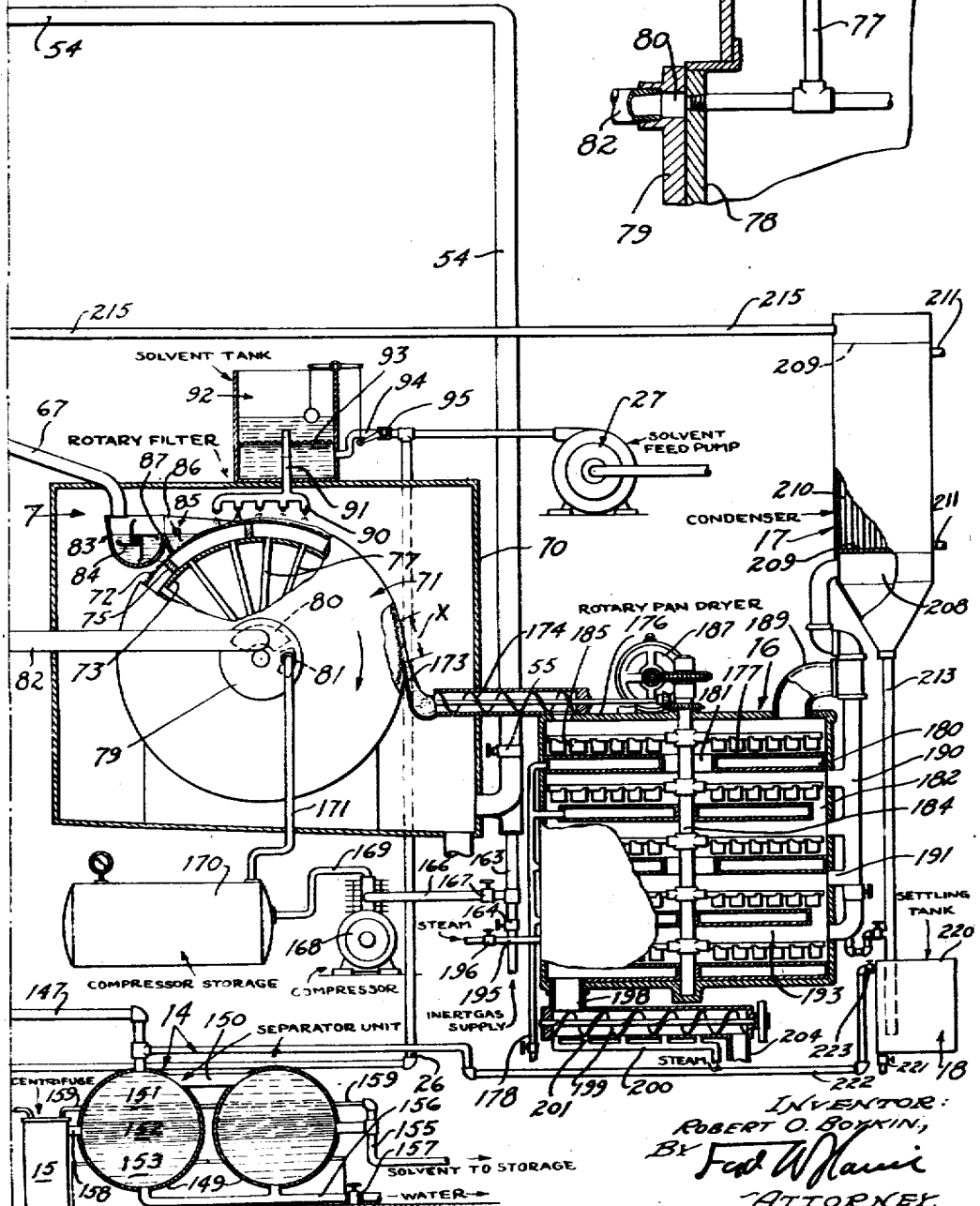

Patented July 23, 1929.

1,721,686

UNITED STATES PATENT OFFICE.

ROBERT O. BOYKIN, OF LOS ANGELES, CALIFORNIA, ASSIGNOR TO N. RUSSELL VAIL, OF LOS ANGELES, CALIFORNIA.

METHOD OF EXTRACTING OILS FROM OLEAGINOUS MATERIALS.

Application filed November 22, 1926. Serial No. 149,856.

My invention relates to a process of recovering oil from oleaginous material such as cottonseed, soya-bean, copra, fish-meal, and the like.

There are various processes well known in the art for recovering oil from oleaginous material, both of the "batch" process and "continuous" process. The essentials of these processes consist in first mixing the oleaginous material, which has been comminuted into a meal, with a suitable solvent so that the oil will be absorbed by the solvent. The solvent and oil solution is then separated from the meal and the oil is thereafter separated from the solvent.

My invention has for its broad object to eliminate certain faults of the ordinary processes, and thus provide a process which will be recognized as superior. The most apparent faults of the ordinary processes are that they are not efficient; thus a certain percentage of oil is not recovered, and there is an absence of economy which would make the process really profitable.

I have found that one requisite to the accomplishment of the broad object of the invention is that the oleaginous meal be very thoroughly mixed with the solvent and that the solvent be given ample time to entirely penetrate or permeate the oleaginous meal so that the oil will be thoroughly absorbed by the solvent.

It is an object of this invention to provide a process of removing oil from oleaginous meal in which oleaginous meal is maintained in contact with a solvent for a prolonged period of time.

I have found that in order to efficiently recover the maximum percentage of oil it is necessary to use solvent in large proportions.

It is an object of this invention therefore to provide a process of recovering oil from oleaginous meal in which a large proportion of solvent is used.

I have discovered that the solvent used in the process must be of a low specific gravity, preferably below that of water, so that the mixing thereof with the meal will be easy. If the solvent used has a higher specific gravity than that of the meal, the mixing will be difficult and unsatisfactory, the meal tending to float on top of the solvent. Under such circumstances efficient extraction of the oil would not be obtained without using an abnormal quantity of solvent.

It is consequently a further object of this invention to provide a process of recovering oil from oleaginous meal in which the oleaginous meal is mixed with a solvent of low specific gravity.

Other inventors have endeavored to reduce the evaporation losses of the solvent, which solvent evaporates freely in the atmosphere, by providing an air-tight apparatus, while others have merely disregarded the evaporation of the solvent, being contented to suffer the loss. Evaporation of the solvent is an important consideration from the standpoint of economy, and any reduction of solvent losses will decrease operating expenses. Experience has taught that it is impossible to make a practical apparatus which is airtight. Consequently such a scheme is not efficacious. In my invention I carry on the process in what is known as an open circuit system and fill the system with an inert gas so that the process is carried on in the presence of the inert gas. The system is maintained at atmospheric pressure or at a pressure of an ounce or so more than atmospheric, so that if any leakage occurs, it will be the passage of inert gas into the atmosphere.

It is accordingly one of the objects of the invention to provide a process of separating oil from oleaginous meal, which process is carried on in the presence of an inert gas.

Various other objects and advantages of the invention will be disclosed in the following description.

Referring to the drawings in which I diagrammatically illustrate an apparatus for carrying on the process of my invention, Fig. 1 is an elevational view partly in section of one portion of the apparatus.

Fig. 2 is an elevational view partly in section of the other portion of the apparatus.

Fig. 3 is a fragmentary section of a filter which forms a part of the apparatus.

Figure 1:
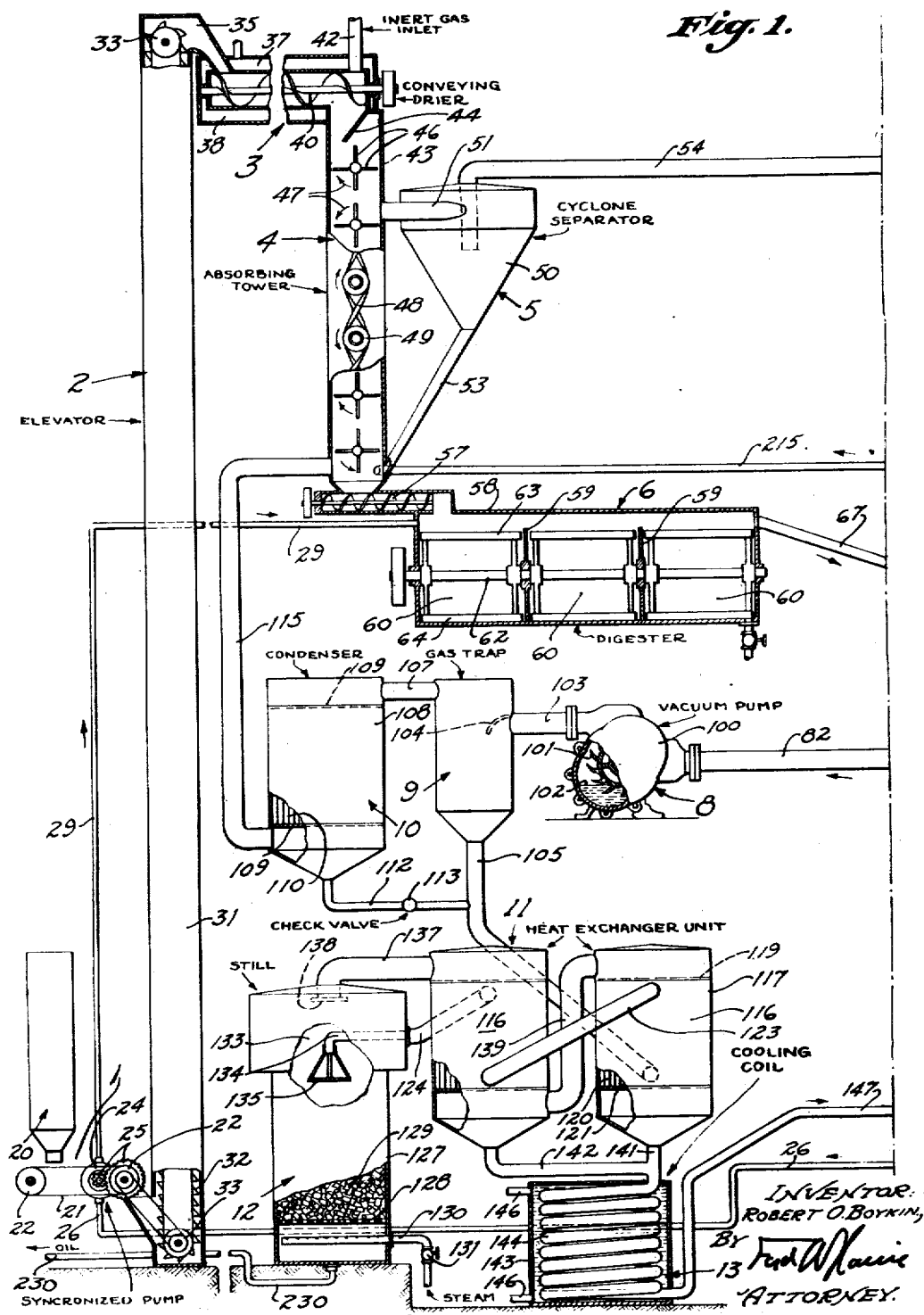

Referring in detail to the drawings, 1 is a poidmeter, 2 is an elevator, 3 is a drier, 4 is an absorbing tower, 5 is a cyclone separator, 6 is a digester, 7 is a rotary filter, 8 is a vacuum pump, 9 is a gas trap, 10 is a condenser, 11 is a heat exchanger unit, 12 is a still, 13 is a cooler, 14 is a separator unit, 15 is an emulsion breaker, 16 is a rotary pan drier, 17 is a condenser, and 18 is a settling tank.

The poidmeter 1 has an oleaginous meal hopper 20 which is adapted to feed meal onto a moving feed belt 21, the feed belt 21 being extended around a pair of pulleys 22. The meal is delivered by the feed belt 21 to the lower end of the elevator 2. The poidmeter 1 also includes a synchronizing pump 24 which is operated from one of the pulleys 22 by gears 25. The synchronizing pump 24 receives a supply of solvent through a pipe line 26 (Fig. 1). The pipe line 26 is connected to a solvent feed pump 27 (Fig. 2). The pump 27 is a centrifugal pump and even though it operates continuously can only build up a certain pressure. The purpose of the pump 27 is, of course, to supply the synchronizing pump 24 with a solvent. The synchronizing pump 24 delivers solvent through a solvent feed pipe 29 to the digester 6. The purpose of the poidmeter is to measure the quantities of oleaginous meal and solvent which are delivered to the digester. It is desirable to have a certain amount of meal and a certain amount of solvent comprising the mixture which is delivered from the digester 6 to the rotary filter 7.

The elevator 2 consists of a housing 31 which encloses a bucket belt 32, the bucket belt 32 extending over sprockets 33 placed at the opposite ends of the housing 31. The meal is delivered into the lower end of the elevator 2 by means of the fed belt 21 and is then carried by the buckets of the bucket belt 32 to the upper end of the housing 31 where it is delivered to the drier 3. The meal is delivered to the drier 3 by means of a conduit 35 which connects to a shell 37 of the drier. The drier 3 in actual practice is quite long so that the meal will be given ample time to be dried. The shell 37 is provided with a steam jacket 38 for heating the interior of the drier, and the drier is provided with a worm conveyor 40 for moving the meal from the left end to the right end of it. An inert gas inlet pipe 42 is connected to the right end of the drier for delivering hot inert gas thereto. The inert gas passes in a leftward direction through the drier and passes downward through the elevator 2.

The absorbing tower 4 consists of a vertically disposed shell 43 having a guiding baffle 44 to guide the meal into revolving agitators 45 mounted in the shell 43. These agitators have a series of axially aligned arms 46 spaced every 90° of rotation and successive agitators are adapted to revolve in opposite directions as indicated by arrows 47, being driven by crossed belts 48 running on pulleys 49 mounted on each agitator. The meal in passing downward through the absorbing tower 4 is retarded, agitated, and any cakes are broken by contact with the arms of the agitators 45.

The cyclone separator 5 consists of a shell 50 having a tangential inlet 51 which is connected to the interior of the absorbing tower 4 slightly above the central part thereof. Extending from the lower end of the shell 50 is a solid material drain pipe 53 which is connected to the extreme lower end of the absorbing tower 4. The cyclone separator also has an inert gas passage 54 having a valve 55 and extending to the rotary filter 7.

The lower end of the absorbing tower 4 is connected to a worm conveyor 57 which delivers the meal to the digester 6.

The digester 6 consists of a shell 58 provided with baffles 59 which divide it into a series of mixing compartments 60. Extending horizontally through the digester 6 is a rotatable shaft 62 to which agitators 63 are attached. There is an agitator 63 in each compartment 60. Each agitator 63 has paddles 64 which mix the meal and solvent. It should be noted that these paddles 64 are placed parallel to the axis of the shaft 62 so that their action on the meal and solvent is not to force them along the digester. The flow of the meal and solvent, that is, the mixture, is caused by displacement resulting from the supplying of solvent and meal to the left compartment 60. The mixture overflows the baffles 59 into the next compartment.

Connected to the upper part of the shell 58 at the right end of the digester is a mixture pipe 67 which extends to the rotary filter 7.

The rotary filter 7 is enclosed by a steel shell 70 to which shell 70 the inert gas line 54 from the cyclone separator 5 is connected. The rotary filter 7 is essentially a standard Oliver filter, well known in different arts and particularly in the art of separating oil from oleaginous meal. Since the Oliver filter is so well known, it is unnecessary to go into a great deal of detail; therefore, in the drawings I have diagrammatically shown only the essential parts.

Referring to the drawings the filter 7 has a drum 71 which is rotatably supported. The drum 71 has a cylindrical filtering medium 72 which is preferably made from a fabric of fine mesh. Inside the filtering medium 72 is a cylindrical wall 73 which provides an annular space 74 which is divided into sections by partitions 75. Connected to each of the sections 74 are pipes 77. The pipes 77, as illustrated in Fig. 3, are connected to an end plate 78. Adapted to operate against the end plate 78 is a valve plate 79. The valve plate 79 is non-rotatable, whereas the end plate 78 is a part of the drum 71 and rotates. The valve plate 79 is provided with a vacuum channel 80 and a pressure channel 81. It will be seen that as the drum rotates, certain of the pipes 77 will be in communication with the vacuum channel 80, whereas another of the pipes 77 will be in communication with the pressure channel 81. The channel 80 is in communication with a vacuum pipe 82 which is connected to the valve plate 79.

The mixture pipe 67, as shown in Fig. 2, extends to the interior of the shell 70 and is adapted to deliver the mixture to a reservoir tank 83 of a cake former. This cake former is of a particular construction and forms the subject matter of my application for Letters Patent entitled Cake former for continuous rotary filter, Serial No. 91,967, filed March 3, 1926. Reference to this application is recommended. Briefly, however, the cake former has the tank 83 to which the mixture is delivered. Carried in the tank 83 is an agitator 84 which is provided to prevent a settling of the meal from the solvent. Adjacent to the reservoir tank 83 is a distributor 85 which has end plates 86. The bottom of the distributor 85 is open so that the mixture which passes thereinto over an overflow wall 87 has direct contact with the filter medium 72 of the rotary filter. As the drum 71 rotates, a cake is applied to the drum.

Wash solvent is supplied to the cake formed, as just described, by means of a plurality of solvent sprays 90. The sprays 90 are connected by a pipe 91 to a solvent tank 92. The solvent tank 92 has a filter medium 93 through which the solvent must pass before it can enter the pipe 91. Solvent is supplied to the lower portion of the solvent tank 92 by a pipe 94 having a flow control valve 95. The pipe 94 is connected to the solvent feed pump 27. It should be noted that the solvent is sprayed onto the cake immediately upon its forming and before any gas can be pulled therethrough. This is important since if any gas is pulled through the cake it will crack and the subsequent washing will not be effective.

The vacuum pipe 82 is connected to the vacuum pump 8. Any type of vacuum pump may be used but I prefer to use a rotary exhauster as shown in the drawings. The rotary exhauster consists of a shell 100 in which a rotor 101 operates. There is always a sealing body 102 of solvent maintained in the pump 8. This type of vacuum pump is desirable since it requires no internal lubrication which in this case is a problem in reciprocating pumps. Connected to the vacuum pump 8 is an outlet pipe 103 which is connected to the gas trap 9.

The gas trap 9 is of standard construction having a baffle plate 104 which directs the ingress downward. The vacuum pump 8 sucks solvent carrying oil, solvent vapor and a little inert gas from the filter. The liquid of the flow delivered to the gas trap passes downward from the gas trap through a solution pipe 105 which is extended to the heat exchanger unit. The solvent vapors and inert gas pass from the upper end of the gas trap 9 through a pipe 107 to the condenser 10.

The condenser 10 may be of any type. The form shown in the drawings consists of a shell 108 in which heads 109 are placed. Connecting between the heads 109 is a plurality of tubes 110. The solvent vapors and inert gas pass into the shell 108 above the upper head 109 and pass through the tubes 110. Surrounding the tubes 110 is a cooling medium which reduces the temperature of the gas and solvent vapor condensing a greater portion of the solvent. The condensates pass from the lower end of the condenser 10 through a pipe 112 to the pipe 105, the pipe 112 having a check valve 113 preventing a reverse flow through the pipe 112. The gases, that is, the solvent vapors and the inert gas are conducted by a pipe 115 to the lower part of the absorbing tower 4. The inert gas and solvent vapors, therefore, pass upward through the absorbing tower, being brought into intimate contact therewith. The solvent is absorbed and adsorbed by the meal passing downward through the absorbing tower, but the gas passes through the tangential pipe 51 to the cyclone separator 5. The inert gas carries some fine particles of meal which are separated in the cyclone separator 5. The meal particles are returned to the lower end of the absorbing tower by the pipe 53. The inert gas passes through the pipe 54 to the shell 70.

The heat exchanger unit 11 to which the pipe 105 is connected comprises a pair of heat exchangers 116. Each heat exchanger 116 is constructed similarly to the condenser 10 having shells 117 which are provided with intermediate heads 119 connected together by tubes 120. The spaces between the heads 119 and around the tubes 120 serve as a space for the cooling medium. The pipe 105 is connected to the lower part of the cooling space 121 of the right-hand heat exchanger 116. Connected to the upper part of this space is a pipe 123 which is connected to the left-hand heat exchanger 116 in communication with the lower part of the cooling space 121 thereof. Connected to the upper part of the cooling space of the left-hand heat exchanger 116 is a pipe 124 which extends to the still 12. The condensates passing through the pipe 105 flow through the cooling spaces 121 of both of the heat exchangers.

The still 12 consists of a shell 127 having a grate 128 supported near the lower end thereof. Filled in the shell 127 above the grate is a multiplicity of short lengths of pipe 129. The still is what is commonly known as a Raschig still. Extending into the shell 127 below the grate 128 is a steam inlet pipe 130 having a valve 131. The upper end of the shell 127 is not filled with the pipes 129 but provides a vapor space 133. The pipe 124 which extends from the left heat exchanger 116 is connected to a pipe 134. Supported below the pipe 134 is a splash plate 135 on which the mixture is dropped, it splashing radially outward and thus being distributed. The mixture flows downward over the lengths of pipe 129 and is divided into a thin film. Connected to the upper end of the still 12 is a solvent vapor outlet 137, the inner end of which is provided with an internal separator 138. The solvent vapor pipe 137 is connected to an upper space in the left heat exchanger 116 above the intermediate head 119. This space is connected to the lower space of this heat exchanger by the tubes 120. Connected to the lower space in the left heat exchanger is a pipe 139 which extends to the upper space of the right heat exchanger 116. The lower space in the right heat exchanger 116 is connected by a pipe 141 to the cooler 13. The lower space in the left heat exchanger 116 is connected to the pipe 141 by means of a pipe 142.

The cooler 13 consists of a shell 143 which encloses a cooling coil 144. The pipe 141 is connected to the cooling coil 144. Cooling fluid, such as water, is circulated within the shell 143 around the coil 144 by means of pipes 146. Connected to the outlet part of the cooling coil 144 is a pipe 147.

The pipe 147 extends to the separator unit 14. The separator unit 14 consists of a pair of separators 149, the upper parts of which are connected together by a pipe 150. The pipe 147, as shown in Fig. 2, extends to the left separator 149, being connected to the upper part thereof. The liquid delivered to the separator unit consists of a mixture of solvent, water which is condensed from the steam, and an emulsion of water and solvent. The liquid stratifies, as shown in Fig. 2, into three layers; an upper layer 151 of solvent, a central layer 152 of emulsion, and a lower layer 153 of water. The solvent in the left separator 149 passes through the pipe 150 to the right separator 149 where additional separation takes place. Solvent is withdrawn from the right separator 149 by means of a pipe 155 which is extended to a solvent storage tank, not shown. Water is withdrawn from the lower parts of both the separators 149 through a pipe 156 having a valve 157.

Placed adjacent to the left separator 149 is an emulsion breaker 15 in the form of a centrifuge. The centrifuge is connected by means of a pipe 158 to the medial portion of the left separator 149 on the level of the layer of emulsion 152 so that the emulsion 152 is passed into the centrifuge 15. In the centrifuge 15 the emulsion is separated into its constituent parts, that is, into solvent and water. The solvent thus separated is conducted through a pipe 159 which is connected to the pipe 155.

Again referring to the rotary filter I will describe the apparatus which handles the cake or the washed meal.

After the cake passes the nozzles 90 the wash solvent is removed therefrom by means of the suction placed on the drum through the suction pipe 82. When the cake reaches the position indicated at X it is loosened from the drum by a blowing action. The blowing action is accomplished as follows: An inert gas supply pipe 163 having a valve 164 is connected to the inert gas pipe 54 adjacent to the housing 70 of the rotary filter. Connected to this pipe 163 above the valve 164 is a pipe 166 having a valve 167. The pipe 166 is connected to a compressor 168. The compressor 168 is connected by means of a pipe 169 to a storage tank 170. The storage tank 170 is connected by means of a pipe 171 to the valve plate 79. The pipe is connected to the valve plate 79 in communication with the channel 81 thereof. When the pipes 77 move into such a position that they communicate with the channel 81, a pressure is applied to the sections 74 with which these pipes are communicated; therefore, the cake will be blown from the filter medium 72. This blowing action has a loosening effect and makes it easy for the cake to be removed. A scraper 173 engages the periphery of the drum 71 where the cake is blown from the drum, removing the cake and directing it into the left end of a worm conveyor 174. The worm conveyor 174 delivers the meal to the upper part of the rotary pan drier 16.

The rotary pan drier 16 consists of a shell 176 having a series of pans 177 supported therein. These pans 177 are supplied with a heating medium such as steam by means of a pipe 178. The pans, as shown, provide closed chambers 180 into which the steam is delivered. Alternate pans 177 have central passages 181 and alternate pans 177 have peripheral passages 182. Extended vertically through the shell 176 is a drive shaft 184 which supports plows 185. The worm conveyor drops the meal onto the upper pan 177. The shaft 184, which is rotated by means of a motor 187, revolves the plows 185. The plows 185 are so formed as to pull the meal inward towards the center of this upper pan. The meal falls through the central opening 181 and drops onto the next pan 177. The plows in the next pan are so formed as to move the meal outward. The meal drops through the peripheral opening 182 around this pan onto the succeeding pan and so on until it reaches the bottom of the drier. When the meal is passed over these pans, it is heated and the remaining wash solvent is vaporized. A greater portion of the solvent vapor passes through a pipe 189 which is connected to the upper part of the shell 176 and other portions of the solvent vapors are withdrawn through a pipe 190 which is connected by branches 191 to the interior of the shell 176 above each of the pans 177. The pipe 190 is connected to the pipe 189 which extends to the condenser 17. Connected to the space immediately above the lower pan 177, which space is denominated a steaming space 193, is a pipe 195 having a valve 196. The pipe 195 may deliver superheated steam or inert gas to the steaming space 193 for the purpose of removing the last touches of solvent which may remain in the meal. The meal is withdrawn from the rotary pan drier 16 through a discharge pipe 198 which is connected to a discharge conveyor 199. The discharge conveyor 199 is provided with a pipe 200 which is connected by pipes 201 to the interior of the conveyor at intervals therealong. Steam is supplied to the conveyor for replacing moisture in the meal which has been removed in the drying process. This replacement of moisture is quite important as it has a preserving effect on the meal and reduces explosibility thereof. The discharge conveyor 199 delivers the meal to a pipe 204 which may extend to a suitable storage bin, not shown.

The pipe 189 is connected to a lower space 208 of the condenser 17. The condenser 17 is of common form like that of the condenser 10 having intermediate heads 209 which are connected together by tubes 210. The space surrounding the tubes 210 has a cooling medium such as water circulated therethrough by pipes 211. The solvent vapors pass into the lower space 208 and upward through the tubes 210. A large percentage of the vapors are condensed, the condensates dropping downward through a condensate pipe 213 to the settling tank 18. The solvent vapors which are not condensed pass upward to the top of the condenser and are withdrawn through a vapor pipe 215. The vapor pipe 215 extends to the lower end of the absorbing tower 4 and the vapor is passed upward therethrough, being absorbed by the meal passing downward in this tower.

The settling tank 18 consists of a shell 220 into which the lower end of the condensate pipe 218 extends. The solvent contains a small percentage of steam condensates which settle in the tank 18, being withdrawn through a pipe 221. The solvent is withdrawn from the upper part of the shell 220 by a pipe 222 having a valve 223. The pipe 222 is extended and connected to the pipe 147 which delivers liquid from the cooler 13 to the separator unit 14.

The operation of the apparatus and the process of the invention will now be described.

In starting up the apparatus, the first operation is to fill the entire system with inert gas. This inert gas may be carbon dioxide, nitrogen, or a mixture of different inert gases. For the purpose of economy it is advisable to use ordinary flue gas from a furnace, which flue gas consists primarily of carbon dioxide and nitrogen. The flue gas is supplied to the apparatus through the inert gas supply pipe 163 which is connected to the inert gas line 54 adjacent to the shell 70. At this time the valve 55 is closed. The valve 164 is open and the vacuum pump 8 is set into operation. The vacuum pump 8 draws the flue gas, that is, the inert gas into the shell 70, through the drum 71, and the vacuum pipe 82. The gas is discharged into the pipe 103 and conducted to the gas trap 9. The inert gas then passes through the condenser 10 and through the pipe 115 to the lower end of the absorbent tower 4. The inert gas passes upward through the drier 3 and downward through the elevator 2, emerging from the lower end thereof. When the inert gas flows from the lower end of the elevator, the valve 55 in the inert gas line 54 is opened and circulation is started through the cyclone separator 5 and the inert gas pipe 54. After this circulation has been established, the valve 167 in the pipe 166 is opened and the compressor 168 is set into operation, establishing a flow of inert gas through this portion of the apparatus. When this circulation has been completed and it is certain that all of the air has been expelled from the apparatus, the valve 164 in the inert gas supply pipe 163 is partially closed. The system is now charged with inert gas and is ready to be set into operation. Various parts of the apparatus are now set into operation.

Oleaginous material is supplied to the feed belt 21 of the poidmeter 1 by means of the hopper 20 and solvent is supplied to the synchronizing pump 24 of the poidmeter 1 by means of the centrifugal pump 27.

The oleaginous meal may be any organic substance which is pregnant with oil. Oil meals formed from cottonseed, flaxseed, copra, fish-meal, soya-bean, and others, may be used. From a standpoint of efficiency of extraction it is desirable that the oleaginous meal be ground with certain limits. I have found that the best results are obtained when the meal is ground, as shown, by the following average Tyler Screen analysis:

| | Per cent. |
|---|---|
| Retained in 10 mesh | 0.5 |
| Retained in 20 mesh | 10.0 |
| Retained in 40 mesh | 24.0 |
| Retained in 60 mesh | 17.0 |
| Passing 60 mesh | 48.5 |

It is desirable to have the meal ground as specified above so that the solvent may readily penetrate the meal. If the meal is too coarse, the solvent will not readily mix therewith, this resulting in a poor penetration of the solvent. The following is a list showing approximate specific gravities of different materials which are treated in my process.

| | |
|---|---|
| Cottonseed meats (30–40% oil) | 1.142 |
| Cottonseed kernels (30–40% oil) | 1.125 |
| Cottonseed meal (8–10% oil) | 1.368 |
| Copra meal (8–10% oil) | 1.135 |
| Soya-bean meal (6–8% oil) | 1.285 |

The solvent used in my process must have certain qualities and I have found that the success of the process depends greatly on the solvent which I employ. The solvent employed in the process should be insoluble in water and be entirely vaporized in and by steam at 135 pounds absolute pressure. The solvent should show no acrid decomposition in the steam and leave no odor in the meal or oil when evaporated. It is highly important that the solvent have a low specific gravity preferably below that of water. As a solvent I prefer to use benzol C. P. or special solvent naphtha having a specific gravity of 0.725 or a mixture of benzol C. P. and special solvent naphtha. Carbon tetrachlorid and similar chlorinated compounds suffer acrid decomposition and also have a high specific gravity in comparison to that of the meal. A consequent disadvantage is that the meals tend to float on the surface of the solvent having a greater specific gravity than the meal so that an inefficient mixing and an inefficient extraction results.

The meal is delivered to the lower end of the elevator and lifted through the elevator by the buckets thereof through the drier 3. The synchronizing pump 24 delivers solvent through the solvent feed line 29 to the digester 6. The synchronizing pump 24 is synchronized with the feed belt 21 so that a certain amount of solvent is supplied to the digester 6 proportionate to the amount of meal delivered to the elevator 2 and subsequently delivered to the digester 6.

In the drier 3 the meal is relieved of its moisture. The moisture content of the meal, before the solvent treatment, should be reduced as low as possible, preferably below five per cent. This is because of the fact that moisture in the mixture delivered to the filter 7 forms into a thick glue with the protein material and clogs the filter medium of the rotary filter. The drying action is accomplished by the heating of the drier 3 and also by means of a reverse flow of hot inert gas which is applied to the drier by means of the inert gas pipe 42, after the apparatus is first charged with inert gas as heretofore explained and before the meal is delivered to the drier. Another function of the inert gas is to drive out any air which may be present in the meal. The inert gas flows continuously while the apparatus is in use in a reverse direction through the drier 3 and the elevator 2, being discharged to the atmosphere at the lower end.

The dried meal passes from the drier 3 into the upper end of the absorbing tower 4. The meal drops downward through the absorbing tower, being conducted through a tortuous path by means of the agitators 45. The meal is brought into intimate contact with gas and solvent vapor which is introduced into the lower end of the absorbing tower 4 by means of the pipes 115 and 215. The solvent vapors of this flow are absorbed by the meal. The meal is then delivered by the worm conveyor 57 to the left compartment 60 of the digester 6. The meal and solvent are thereafter thoroughly mixed together.

The operation of the digester 6 is very important to the process. It should be noted that the paddles 64 extend perpendicularly to their plane of movement. The purpose of these paddles is not to move the mixture longitudinally along the digester 6 but to move the mixture in a circular path. The mixture of solvent and meal is mixed to the extent that any soluble matter is removed from the meal and the meal is kept in suspension in the mixture. The movement of the mixture of solvent and meal longitudinally along the digester 6 is caused entirely by the supplying of additional meal and solvent to the left compartment 60. When additional material is added, the level of the mixture in the left compartment 60 rises above the top of the adjacent baffle 59 and overflows into the adjacent compartment 60. From this it is obvious that if there were no feeding of material into the digester there would be no longitudinal movement of the mixture along the digester. One of the very important parts of the invention is that the meal and solvent be agitated together for a prolonged period of time. To obtain an efficient extraction of oil from the meal, the solvent and meal must remain in intimate contact with constant agitation for a period of not less than thirty minutes. I have found that an agitation of between thirty minutes and one hour is satisfactory providing the meal corresponds in fineness to the aforementioned approximate screen analysis.

The mixture passes from the right compartment 60 through the pipe 67 to the reservoir tank 83 of the rotary filter 7. The agitating paddles 84 operate to prevent a stratification of the mixture in the reservoir tank 83. As the mixture is introduced to the reservoir tank it will overflow the wall 87 and pass into the distributor 85 forming a body therein. The constituent parts of the mixture may be classified as heavy particles, light particles, and very fine matter. The heavy particles drop to the lower part of the distributor 85, the light particles drop to the central part, and the very fine matter remains on top. The rotary drum 71 is revolved in a direction indicated by the arrow thereof, and the mixture is pulled onto the filter medium 72 by means of the vacuum placed thereon. The mixture forms the cake, which cake consists of three distinct layers. The lower layer is formed of heavy coarse particles and is quite porous. On top of the porous coating is a coating or layer of light particles which are less porous. The very fine matter is coated on top of the other two layers and is prevented from contacting the filter medium. This is important because it prevents the very fine matter from reaching the filter medium 72 and therefore the filter medium will not be clogged.

Immediately after the cake is formed and before any gas can be drawn therethrough, wash solvent is sprayed onto the cake. This wash solvent is taken from the solvent tank 92, as previously described and as illustrated in Fig. 2. Washing the cake must be carried out carefully and efficiently and a large amount of wash solvent must be used. As soon as the preliminary solution has disappeared from the surface of the cake by the effect of the vacuum applied, the wash must be applied. The application of the wash must begin before any gas has had time to penetrate or pass through the cake since the passage of gas through the cake causes it to crack in numerous places, through which cracks the wash solvent will pass without in reality washing the cake. The wash solvent should be applied as long as the mixture is being fed to the filter and until the oil content of the cake has been reduced as low as desired. The average oil content of the cake taken at six-inch intervals along the periphery of the drum is as follows:

|  | 8-10% material | 30-40% material |
| --- | --- | --- |
| Before removing solvent | 1.50% | 11.86% |
| Six inches from lip of distributor | 0.68% | 5.13% |
| Twelve inches from lip of distributor | 0.41% | 3.98% |
| Eighteen inches from lip of distributor | 0.31% | 1.91% |
| Twenty-four inches from lip of distributor | 0.22% | 1.34% |
| Thirty-four inches from lip of distributor | 0.19% | 0.93% |

The solvent, it should be understood, has dissolved the oil so that the liquid which is removed from the cake is in the form of a solution consisting of solvent and oil. The solution passes through the pipes 77 and through the pipe 82 to the vacuum pump 8. The suction produced by the vacuum pump, of course, draws some gas from the interior of the shell 70. Also some of the solvent has changed into a vapor. For this reason the flow drawn through the pipe 82 consists of the mixture of oil and solvent and inert gas and solvent vapors. All this is delivered from the pump 8 through the pipe 103 to the gas trap 9. The mixture of oil and solvent passes from the gas trap 9 through the pipe 105 to the heat exchanger unit 11. The inert gas and vapors pass through the pipe 107 to the condenser 10 where a greater portion of the solvent vapors are condensed, these condensates passing through the pipe 112 to the pipe 105, being conducted with the mixture to the heat exchanger unit 11. The remaining gaseous fluids pass upward through the pipe 115 and, as previously explained, are brought into intimate contact with the incoming meal so that the solvent vapors are absorbed and adsorbed thereby. The flue gas, however, is not absorbed and passes through the pipe 51 into the cyclone separator 5. The flue gas carries fine particles of meal which are separated and returned to the lower end of the absorbing tower 4 by means of the pipe 53. The inert gases pass through the pipe 54 to the shell 70. It should be noted that the inert gas from the vacuum pump is not discharged directly into the shell 70 but is delivered through the absorbing tower, the cyclone separator 5 and the pipe 54. It has been found impractical to deliver inert gas directly to the filter shell 70 without first removing solvent vapor. The sudden expansion of the vacuum pump exhaust causes a precipitation of fluid. The precipitated fluid becomes a fine rain and it wets the final cake as it is being removed from the drum 71 to the extent that it contains from 35% to 40% solvent, whereas under proper conditions the content of the cake should only be 20% to 25%. It is for this reason that I prefer to discharge the inert gas and solvent into the base of the absorption tower 4. The passage of gas upward through the tower is very slow under proper working conditions, being about twenty-five feet per minute.

The solution of oil and solvent delivered to the heat exchanger unit 11 is cool and is used as a cooling medium for the hot vapors passing from the still 12. The solution passes through the cooling space 121 of the right heat exchanger 116 through the pipe 123 and through the cooling space 121 of the left heat exchanger 116. The solution absorbs the heat of the hot vapors and is warm by the time it passes through the pipe 124 and into the pipe 134 of the still 12. The solution drops onto the splash plate 135 and is diffused in the shell 127. The solution is divided into a thin film by the short pipes 129 so that it can be effectively acted upon by steam introduced by the steam pipe 130. The steam is preferably at a pressure of 135 pounds, it passing upward through the still, being brought into intimate contact with the solution. The solvent of the solution is vaporized and carried upward through the still with the steam. The oil which boils at a higher temperature than the solvent is not vaporized but passes into the lower part of the still and is withdrawn therefrom by means of an oil take-off pipe 230. The vapors of the still must pass through the internal separator 138 where any liquid particles are prevented from passing into the pipe 137. The vapors pass through the heat exchangers 116 and the temperature thereof is considerably reduced. Condensates formed in the left heat exchanger 116 pass through the pipe 142 to the pipe 141. The vapors not condensed in the left heat exchanger 116 pass into the right heat exchanger 116 where they are condensed, the condensates passing through the pipe 141 and into the cooler 13.

The condensates pass through the coil 144 of the cooler 13, being greatly reduced in temperature and they are thereafter delivered by the pipe 147 to the separator unit 14. The condensates consist, as previously explained, of solvent, water, and an emulsion of solvent and water. These three constituents tend to stratify in the left separator tank 149, as illustrated. The solvent is conducted from the left separator tank 149 to the right separator tank 149 where a further separation takes place. The solvent is withdrawn from the right separator 149 through a pipe 155 by means of which it is delivered to a solvent storage. Water separated from the mixture is withdrawn from the separator tank 149 by means of the pipe 156. The emulsion indicated at 152 is withdrawn from the left separator tank 149 and delivered to the emulsion breaker 15 where the water and solvent are separated, the separated solvent being delivered by the pipe 159 to the pipe 155 by means of which it is delivered with the other solvent to the storage tank.

Again referring to the filter, when the cake reaches the portion of the drum indicated at X blowing gas loosens it from the drum, as previously explained, and the scraper 173 removes it from the drum delivering it to the worm conveyor 174. The worm conveyor 174 delivers meal to the rotary pan drier 16. The meal at this time has a solvent content of 20% to 25%. The meal drops onto the upper pan 177 and is moved inward thereon by the plows 185. It passes through the central opening 181 and drops onto a lower pan and is consecutively moved across the following lower pans by the plows until it reaches the steaming chamber 193. The drying of the cake from the filter is best carried out in the rotary pan drier since the heat is indirect. It has been found that when the meal is freed from solvent with direct steam and consequently dried, the cake turns black and becomes practically valueless as a feeding material or as a by-product, thus lowering its economic value. It may be well to state that no economy is gained from freeing the solvent by direct steam and then drying out the water with indirect steam. Practically all the solvent has been vaporized from the meal when it reaches the steaming space 193. Superheated steam of at least 20° Fahrenheit superheat is introduced into the space 193 so that the last traces of solvent odor will be removed. I have found that in place of using steam for removing the last traces of solvent odor, inert gas may be used. The cake is then discharged through the pipe 198 into the discharge conveyor 199 where steam is introduced through the pipe 200. This introduction of steam supplies a water content which is desirable for the preservation of the meal and is also desirable inasmuch as it reduces its explosibility.

The steam and solvent vapors pass through the pipes 189 and 190, as previously described, into the lower space 208 of the condenser 17. The vapors pass upward through the condenser and a greater portion thereof is condensed, these condensates consisting of water and solution. The condensates pass downward through the pipe 213 to the settling tank 18 where the water and solvent separate by stratification. The water is withdrawn from the tank 18 through the pipe 221 and the solution is withdrawn through the pipe 222, being delivered to the pipe 147 and flowing with the other solution to the separator unit 14. The vapors may also have an inert gas constituent if inert gas is employed in the space 193. A portion of the solvent is not condensed and will be conducted, with any inert gas, through the pipe 215 to the lower end of the absorbing tower 4 where the solvent vapors are absorbed by the incoming meal, the inert gas passing into the cyclone separator 5.

It should be understood that instead of passing solvent vapor through the absorbing tower 4 from the pipe 115 any convenient means for recovering the solvent vapor may be employed, or, its economy of operation is no factor, the vapors may be discharged into the atmosphere.

In the operation of my invention I keep the valve 164 of the inert gas supply pipe 163 partially open so that inert gas is supplied to the apparatus, thus preventing the entrance of air and to compensate for inert gas which passes to the atmosphere. My system is essentially an open one, with pressures in the digester 6 slightly above atmospheric due to solvent feed pump 27 and the synchronized pump 24. It should be apparent, however, that the digester 6 is in communication with the atmosphere through the absorbing tower 4, the drier 3, and the elevator 2 which is open to the atmosphere at its base. This pressure slightly above atmospheric permits a flow of inert gases outward in case of a leak rather than permitting air to leak in.

I claim as my invention:

1. A process of recovering oil from oleaginous meal comprising: removing from said meal a sufficient proportion of its contained moisture to render it substantially dry; agitating said meal with a water insoluble oil solvent of a specific gravity not higher than the specific gravity of said meal for not less than one-half hour, thereby forming a mixture, said solvent dissolving the oil from said meal; distributing said mixture upon a supporting medium; removing the solution of solvent and oil from said cake; washing said meal with a fresh supply of said solvent; removing the solution of said wash solvent and oil from said meal; and separating said oil from said solvent.

2. A process of recovering oil from oleaginous meal comprising: removing from said meal a sufficient proportion of its contained moisture to render it substantially dry; agitating said meal with a water insoluble oil solvent of a specific gravity not higher than the specific gravity of said meal for not less than one-half hour, thereby forming a mixture, said solvent dissolving the oil from said meal; distributing said mixture upon a supporting medium; removing the solution of solvent and oil from said meal; washing said cake with a fresh supply of said solvent; removing the solution of said wash solvent and oil from said meal; separating any solvent vapors from said solution; passing said solvent vapors into contact with said meal before it is mixed with said solvent, said solvent vapors being absorbed thereby; and separating said oil from said solvent.

3. A process of recovering oil from oleaginous meal comprising: removing from said meal a sufficient proportion of its contained moisture to render it substantially dry; agitating said meal with a water insoluble oil solvent of a specific gravity not higher than the specific gravity of said meal for not less than one-half hour, thereby forming a mixture, said solvent dissolving the oil from said meal; distributing said mixture into a cake; removing the solution of solvent and oil from said meal; washing said meal with a fresh supply of said solvent immediately after said solution has been removed and before any gas can pass through said meal; removing the solution of said wash solvent and oil from said meal; and separating said oil from said solvent.

4. A process of recovering oil from oleaginous meal comprising: removing from said meal a sufficient proportion of its contained moisture to render it substantially dry; agitating said meal with a water insoluble oil solvent of a specific gravity not higher than the specific gravity of said meal for not less than one-half hour, thereby forming a mixture, said solvent dissolving the oil from said meal; distributing said mixture upon a supporting medium; removing the solution of solvent and oil from said meal; washing said meal with a fresh supply of said solvent immediately after said solution has been removed and before any gas can pass through said meal; removing the solution of said wash solvent and oil from said meal; separating any solvent vapors from said solution; passing said solvent vapors into contact with said meal before it is mixed with said solvent, said solvent vapors being absorbed thereby; and separating said oil from said solvent.

5. A process as defined in claim 1 in which the steps are carried on in the presence of an inert gas.

6. A process as defined in claim 2 in which the steps are carried on in the presence of an inert gas.

7. A process as defined in claim 3 in which the steps are carried on in the presence of an inert gas.

8. A process as defined in claim 4 in which the steps are carried on in the presence of an inert gas.

9. A process of recovering oil from oleaginous meal comprising: removing from said meal a sufficient proportion of its contained moisture to render it substantially dry; passing an inert gas in contact with said meal to drive the air therefrom; agitating said meal with a water insoluble oil solvent of a specific gravity not higher than the specific gravity of said meal for not less than one-half hour, thereby forming a mixture, said solvent dissolving the oil from said meal; distributing said mixture upon a supporting medium; removing the solution of solvent and oil from said meal; washing said meal with a fresh supply of said solvent; removing the solution of said wash solvent and oil from said meal; and separating said oil from said solvent.

10. A process of recovering oil from oleaginous meal comprising: removing from said meal a sufficient proportion of its contained moisture to render it substantially dry; passing an inert gas in contact with said meal to drive the air therefrom; agitating said meal with a water insoluble oil solvent of a specific gravity not higher than the specific gravity of said meal for not less than one-half hour, thereby forming a mixture, said solvent dissolving the oil from said meal; distributing said mixture upon a supporting medium; removing the solution of solvent and oil from said meal; washing said meal with a fresh supply of said solvent; removing said wash solvent and oil from said meal; separating any solvent vapors from said solution; passing said solvent vapors into contact with said meal before it is mixed with said solvent, said solvent vapors being absorbed thereby; and separating said oil from said solvent.

11. A process of recovering oil from oleaginous meal comprising: removing from said meal a sufficient proportion of its contained moisture to render it substantially dry; passing an inert gas in contact with said meal to drive the air therefrom; agitating said meal with a water insoluble oil solvent of a specific gravity not higher than that of said meal for not less than one-half hour, thereby forming a mixture, said solvent dissolving the oil from said meal; distributing said mixture upon a supporting medium; removing the solution of solvent and oil from said meal; washing said meal with a fresh supply of said solvent immediately after said solution has been removed and before any gas can pass through said meal; removing the solution of said wash solvent and oil from said meal; and separating said oil from said solvent.

12. A process of recovering oil from oleaginous meal comprising: removing from said meal a sufficient proportion of its contained moisture to render it substantially dry; agitating said meal with a water insoluble oil solvent of a specific gravity not higher than the specific gravity of said meal for not less than one-half hour, thereby forming a mixture, said solvent dissolving the oil from said meal; distributing said mixture upon a porous supporting medium; removing the solution of solvent and oil from said meal by means of a vacuum; washing said meal with a fresh supply of said solvent; removing the solution of said wash solvent and oil from said meal by means of a vacuum; and separating said oil from said solvent.

13. A process of recovering oil from oleaginous meal comprising: removing from said meal a sufficient proportion of its contained moisture to render it substantially dry; passing an inert gas in contact with said meal to drive the air therefrom; agitating said meal with a water insoluble oil solvent of a specific gravity not higher than that of said meal for not less than one-half hour, thereby forming a mixture, said solvent dissolving the oil from said meal; distributing said mixture upon a porous supporting medium; removing the solution of solvent and oil from said meal by means of a vacuum; washing said meal with a fresh supply of said solvent; removing the solution of said wash solvent and oil from said meal by means of a vacuum; and separating said oil from said solvent.

14. A process as defined in claim 2 in which said meal is agitated while it is contacted by said solvent vapor.

In testimony whereof, I have hereunto set my hand at Los Angeles, California, this 13th day of November, 1926.

ROBERT O. BOYKIN.

CERTIFICATE OF CORRECTION.

Patent No. 1,721,686.  Granted July 23, 1929, to

ROBERT O. BOYKIN.

It is hereby certified that error appears in the printed specification of the above numbered patent requiring correction as follows: Page 9, lines 4 and 21, claims 1 and 2 respectively, for the word "cake" read "meal"; line 38, claim 3, strike out the words "into a cake" and insert instead "upon a supporting medium"; line 114, claim 10, after the word "removing" insert the words "the solution of"; and that the said Letters Patent should be read with these corrections therein that the same may conform to the record of the case in the Patent Office.

Signed and sealed this 10th day of September, A. D. 1929.

(Seal)

M. J. Moore,
Acting Commissioner of Patents.

said meal; distributing said mixture upon a supporting medium; removing the solution of solvent and oil from said meal; washing said meal with a fresh supply of said solvent immediately after said solution has been removed and before any gas can pass through said meal; removing the solution of said wash solvent and oil from said meal; and separating said oil from said solvent.

12. A process of recovering oil from oleaginous meal comprising: removing from said meal a sufficient proportion of its contained moisture to render it substantially dry; agitating said meal with a water insoluble oil solvent of a specific gravity not higher than the specific gravity of said meal for not less than one-half hour, thereby forming a mixture, said solvent dissolving the oil from said meal; distributing said mixture upon a porous supporting medium; removing the solution of solvent and oil from said meal by means of a vacuum; washing said meal with a fresh supply of said solvent; removing the solution of said wash solvent and oil from said meal by means of a vacuum; and separating said oil from said solvent.

13. A process of recovering oil from oleaginous meal comprising: removing from said meal a sufficient proportion of its contained moisture to render it substantially dry; passing an inert gas in contact with said meal to drive the air therefrom; agitating said meal with a water insoluble oil solvent of a specific gravity not higher than that of said meal for not less than one-half hour, thereby forming a mixture, said solvent dissolving the oil from said meal; distributing said mixture upon a porous supporting medium; removing the solution of solvent and oil from said meal by means of a vacuum; washing said meal with a fresh supply of said solvent; removing the solution of said wash solvent and oil from said meal by means of a vacuum; and separating said oil from said solvent.

14. A process as defined in claim 2 in which said meal is agitated while it is contacted by said solvent vapor.

In testimony whereof, I have hereunto set my hand at Los Angeles, California, this 13th day of November, 1926.

ROBERT O. BOYKIN.

CERTIFICATE OF CORRECTION.

Patent No. 1,721,686.   Granted July 23, 1929, to

ROBERT O. BOYKIN.

It is hereby certified that error appears in the printed specification of the above numbered patent requiring correction as follows: Page 9, lines 4 and 21, claims 1 and 2 respectively, for the word "cake" read "meal"; line 38, claim 3, strike out the words "into a cake" and insert instead "upon a supporting medium"; line 114, claim 10, after the word "removing" insert the words "the solution of"; and that the said Letters Patent should be read with these corrections therein that the same may conform to the record of the case in the Patent Office.

Signed and sealed this 10th day of September, A. D. 1929.

M. J. Moore,
Acting Commissioner of Patents.

(Seal)